(12) United States Patent
Reddy et al.

(10) Patent No.: US 11,397,037 B2
(45) Date of Patent: Jul. 26, 2022

(54) REFRIGERATION APPLIANCE WITH SLIM ICE MAKER

(71) Applicant: Electrolux Home Products, Inc., Charlotte, NC (US)

(72) Inventors: Lokesha Kodigenahalli Chinnappa Reddy, Anderson, SC (US); Marcelo C. Candeo, Anderson, SC (US); Shawn Boiter, Anderson, SC (US); Thomas McCollough, Anderson, SC (US)

(73) Assignee: Electrolux Home Products, Inc., Charlotte, NC (US)

( * ) Notice: Subject to any disclaimer, the term of this patent is extended or adjusted under 35 U.S.C. 154(b) by 180 days.

(21) Appl. No.: 16/755,965

(22) PCT Filed: Oct. 24, 2017

(86) PCT No.: PCT/US2017/057949
§ 371 (c)(1),
(2) Date: Apr. 14, 2020

(87) PCT Pub. No.: WO2019/083498
PCT Pub. Date: May 2, 2019

(65) Prior Publication Data
US 2020/0248945 A1 Aug. 6, 2020

(51) Int. Cl.
*F25D 11/02* (2006.01)

(52) U.S. Cl.
CPC ............ *F25D 11/02* (2013.01); *F25D 11/022* (2013.01)

(58) Field of Classification Search
CPC ........ F25C 5/22; F25C 2400/10; F25C 5/182;
F25C 1/04; F25C 2500/02; F25C 5/18;
F25C 1/00; F25C 1/24; F25C 2300/00;
F25C 2305/022; F25C 5/24; F25D
2201/126; F25D 23/064; F25D 23/067;
(Continued)

(56) References Cited

U.S. PATENT DOCUMENTS

| | | | |
|---|---|---|---|
| 4,925,350 A * | 5/1990 | Kolseth | B29C 70/745 411/520 |
| 5,749,241 A | 5/1998 | Ryu et al. | |

(Continued)

FOREIGN PATENT DOCUMENTS

| | | |
|---|---|---|
| DE | 102007021570 | 11/2008 |
| JP | S5042375 | 4/1975 |
| WO | 2016070284 | 5/2016 |

OTHER PUBLICATIONS

International Search Report for PCT/US2017/057949, dated Jul. 4, 2018, 3 pages.

*Primary Examiner* — Filip Zec
(74) *Attorney, Agent, or Firm* — Pearne & Gordon LLP

(57) ABSTRACT

An ice maker for producing and storing ice pieces. The ice maker is mountable to a liner of a fresh food compartment at an intersection of a top wall and a lateral side wall of the liner. The ice maker includes an ice tray for forming ice pieces. An ice bin receives and stores ice pieces produced by the ice tray. A housing contains the ice tray and ice bin. The housing has a first side, a second side, a bottom and a top. A first cavity is formed in the first side and a second cavity is formed in the bottom. A thermal insulation is disposed in the first cavity and the second cavity. The second side of the ice maker housing does not include thermal insulation.

19 Claims, 12 Drawing Sheets

(58) Field of Classification Search
CPC ........ F25D 17/065; F25D 21/04; F25D 23/00;
F25D 23/065; F25D 23/066; F25D
23/087; F25D 23/12; F25D 2400/02;
F25D 11/02; F25D 17/00; F25D 17/04;
F25D 2201/10; F25D 2317/061; F25D
2331/809; F25D 23/006; F25D 23/025;
F25D 23/061; F25D 23/069; F25D
2400/00; F25D 25/02; F25D 25/025
See application file for complete search history.

(56) References Cited

U.S. PATENT DOCUMENTS

| | | | |
|---|---|---|---|
| 6,823,689 B2 | 11/2004 | Kim et al. | |
| 9,982,932 B2 * | 5/2018 | Lindel | F25D 23/006 |
| 10,527,335 B2 * | 1/2020 | Bertolini | F25C 1/04 |
| 2006/0266059 A1 * | 11/2006 | Wetekamp | F25C 5/22 |
| | | | 62/275 |
| 2013/0105494 A1 * | 5/2013 | Jung | F25D 23/062 |
| | | | 220/592.05 |
| 2013/0167575 A1 | 7/2013 | Hong et al. | |
| 2013/0263620 A1 | 10/2013 | An et al. | |
| 2013/0264929 A1 | 10/2013 | An et al. | |
| 2013/0298404 A1 | 11/2013 | An et al. | |
| 2014/0182325 A1 * | 7/2014 | Lee | F25C 1/04 |
| | | | 62/340 |
| 2016/0370072 A1 | 12/2016 | Yang | |
| 2016/0370097 A1 | 12/2016 | Yang | |
| 2016/0370103 A1 | 12/2016 | Yang | |
| 2017/0292773 A1 | 10/2017 | Yang | |

* cited by examiner

REFRIGERATION APPLIANCE WITH SLIM ICE MAKER

FIELD OF THE INVENTION

This application relates generally to an ice maker for a refrigeration appliance, and more particularly, to a refrigeration appliance including an ice maker disposed within a fresh food compartment of a refrigerator that is maintained at a temperature above a freezing temperature of water at atmospheric conditions.

BACKGROUND OF THE INVENTION

Conventional refrigeration appliances, such as domestic refrigerators, typically have both a fresh food compartment and a freezer compartment or section. The fresh food compartment is where food items such as fruits, vegetables, and beverages are stored and the freezer compartment is where food items that are to be kept in a frozen condition are stored. The refrigerators are provided with a refrigeration system that maintains the fresh food compartment at temperatures above 0° C., such as between 0.25° C. and 4.5° C. and the freezer compartments at temperatures below 0° C., such as between 0° C. and −20° C.

Conventional refrigerators are often provided with a unit for making ice pieces, commonly referred to as "ice cubes" despite the non-cubical shape of many such ice pieces. These ice making units normally are located in the freezer compartments of the refrigerators and manufacture ice by convection, i.e., by circulating cold air over water in an ice tray to freeze the water into ice cubes. However, for refrigerators such as a so-called "bottom mount" refrigerator, which includes a freezer compartment disposed vertically beneath a fresh food compartment, placing the ice maker within the freezer compartment is impractical. Users would be required to retrieve frozen ice pieces from a location close to the floor on which the refrigerator is resting. And providing an ice dispenser located at a convenient height, such as on an access door to the fresh food compartment, would require an elaborate conveyor system to transport frozen ice pieces from the freezer compartment to the dispenser on the access door to the fresh food compartment. Thus, ice makers are commonly included in the fresh food compartment of bottom mount refrigerators, which creates many challenges in making and storing ice within a compartment that is typically maintained above the freezing temperature of water.

Accordingly, there is a need in the art for a refrigerator including an ice maker that is compact and does not occupy an appreciably large space in the fresh food compartment.

BRIEF SUMMARY OF THE INVENTION

In accordance with one aspect, there is provided a refrigeration appliance including a fresh food compartment for storing food items in a refrigerated environment having a target temperature above zero degrees Centigrade. A liner defines the fresh food compartment and includes a top wall, a bottom wall, and a pair of opposing lateral side walls. An ice maker is disposed within the fresh food compartment for producing and storing ice pieces and mounted to the liner at an intersection of the top wall and one of the pair of opposing lateral side walls of the liner. The ice maker includes an ice tray for forming ice pieces. An ice bin receives and stores ice pieces produced by the ice tray. A housing contains the ice tray and ice bin. The housing has a first side, a second side, a bottom and a top and includes a first housing portion defining at least one of the bottom and the first side of the housing. A second housing portion defines at least one of the top and the second side of the housing. Thermal insulation is disposed on the bottom, the first side and the top of the housing. The second side of the ice maker housing is free of thermal insulation and abuts the one of the pair of opposing lateral side walls.

The refrigerator appliance is provided such that at least one of the first housing portion and the second housing portion is L-shaped or U-shaped.

The refrigerator appliance is provided such that the top wall of the liner includes a recess, and a tab extends upwards beyond the top of the housing and is received within the recess of the liner.

The refrigerator appliance is provided such that the foregoing tab extends along an edge between the first side and the top of the housing.

The refrigerator appliance is provided such that the thermal insulation includes a first insulation member interposed between the exterior surface of the first side and the interior surface of the first side; a second insulation member interposed between the exterior surface of the bottom and the interior surface of the bottom; and a third insulation member interposed between the exterior surface of the top and the top wall of the liner.

The refrigerator appliance is provided such that each of the first, second, and third insulation members described above includes a rigid pre-formed EPS panel.

The refrigerator appliance includes an anchor disposed in the top wall of the liner. An end of the anchor extending through the top wall of the liner and having a flange for engaging a receiving opening formed in the top of the housing.

The refrigerator appliance includes an anchor disposed in one of the pair of opposing lateral side walls; and a fastener extending through the second side of the housing into the anchor for securing the housing to the liner.

The refrigerator appliance includes an opening in a back wall of the liner positioned proximate the ice maker; and a backplate for receiving an evaporator of the ice maker. The backplate attachable to the back wall of the liner to enclose the opening in the back wall.

In accordance with another aspect, there is provided a refrigeration appliance including a fresh food compartment for storing food items in a refrigerated environment having a target temperature above zero degrees Centigrade. A liner defines the fresh food compartment and includes a top wall, a bottom wall, and a pair of opposing lateral side walls. An ice maker is disposed within the fresh food compartment for producing and storing ice pieces and mounted to the liner at an intersection of the top wall and one of the pair of opposing lateral side walls. The ice maker includes an ice tray for forming ice pieces. An ice bin receives and stores ice pieces produced by the ice tray. A housing contains the ice tray and ice bin. The housing has a first side, a second side, a bottom and a top. A first cavity is formed in the first side and a second cavity is formed in the bottom. A thermal insulation is disposed in the first cavity and the second cavity. The second side of the ice maker housing is free of thermal insulation and abuts the one of the pair of opposing lateral side walls.

The refrigerator appliance further includes a first housing portion defining an exterior surface of the bottom and an exterior surface of the first side; a second housing portion defining the second side and an interior surface of the bottom; and a third housing portion defining an exterior surface of the top and an interior surface of the first side. The first housing portion and the third housing portion define the first cavity in the first side and the first housing portion and the second housing portion define the second cavity in the bottom.

The refrigerator appliance is provided such that said thermal insulation includes: a first insulation member interposed between the exterior surface of the first side and the interior surface of the first side; a second insulation member interposed between the exterior surface of the bottom and the interior surface of the bottom; and a third insulation member interposed between the exterior surface of the top and the top wall of the liner.

The refrigerator appliance is provided such that each of the first, second, and third insulation members described above includes a rigid pre-formed EPS panel.

The refrigerator appliance is provided such that the top wall of the liner includes a recess, and a tab extends upwards beyond the top of the housing and is received within the recess of the liner.

The refrigerator appliance is provided such that the foregoing tab extends along an edge between the first side and the top of the housing.

The refrigerator appliance includes an anchor disposed in the top wall of the liner. An end of the anchor extending through the top wall of the liner and having a flange for engaging a receiving opening formed in the top of the housing.

The refrigerator appliance includes an anchor disposed in one of the pair of opposing lateral side walls and a fastener extending through the second side of the housing into the anchor for securing the housing to the liner.

The refrigerator appliance includes an opening in a back wall of the liner positioned proximate the ice maker and a backplate receiving an evaporator of the ice maker. The backplate is attachable to the back wall of the liner to enclose the opening in the back wall.

In accordance with yet another aspect, there is provided an ice maker for producing and storing ice pieces. The ice maker mountable to a liner of a fresh food compartment at an intersection of a top wall and a lateral side wall of the liner. The ice maker including an ice tray for forming ice pieces. An ice bin receives and stores ice pieces produced by the ice tray. A housing contains the ice tray and ice bin. The housing has a first side, a second side, a bottom and a top. A first cavity is formed in the first side and a second cavity is formed in the bottom. A thermal insulation is disposed in the first cavity and the second cavity. The second side of the ice maker housing is free of thermal insulation.

The housing of the ice maker including a first housing portion defining an exterior surface of the bottom and an exterior surface of the first side; a second housing portion defining the second side and an interior surface of the bottom; and a third housing portion defining an exterior surface of the top and an interior surface of the first side. The first housing portion and the third housing portion define the first cavity in the first side and the first housing portion and the second housing portion define the second cavity in the bottom.

The thermal insulation of the ice maker including a first insulation member interposed between the exterior surface of the first side and the interior surface of the first side; a second insulation member interposed between the exterior surface of the bottom and the interior surface of the bottom; and a third insulation member interposed between the exterior surface of the top and the top wall of the liner.

The foregoing housings of the ice maker being positioned over an air handler assembly and rotated upwards until the top of the housing engages the top wall of the liner and the tab of the housing is received into a recess in the top wall of the liner. The tab and the recess being configured to allow for the proper positioning of the housing against the liner and to aid in retaining the housing against the liner while an operator secures the housing to the liner.

The foregoing housings further including a ring-shaped protrusion in the top insulation member that is dimensioned and positioned to engage the lower surface of the top wall of the liner when the housing is secured to the liner. The ring-shaped protrusion providing a rim-seal as against the below-freezing air of the ice maker to thereby inhibit ice crystal formation during water supply to the ice tray.

The foregoing housing further including anchors for supporting and/or attaching the housing to the liner. The anchors configured to engage a mating feature in the top of the housing to secure the housing to the top wall of the liner or to at least temporarily hold the housing in place against gravity at the desired installed position.

The foregoing housing further including fasteners that extend through the side of the housing into the anchors to secure the housing to the liner. During installation, while some of the anchors are supporting the housing within the fresh food compartment, the remaining anchors receive the fasteners to secure the housing to the liner.

DESCRIPTION OF EXAMPLE EMBODIMENTS

Figure 1:
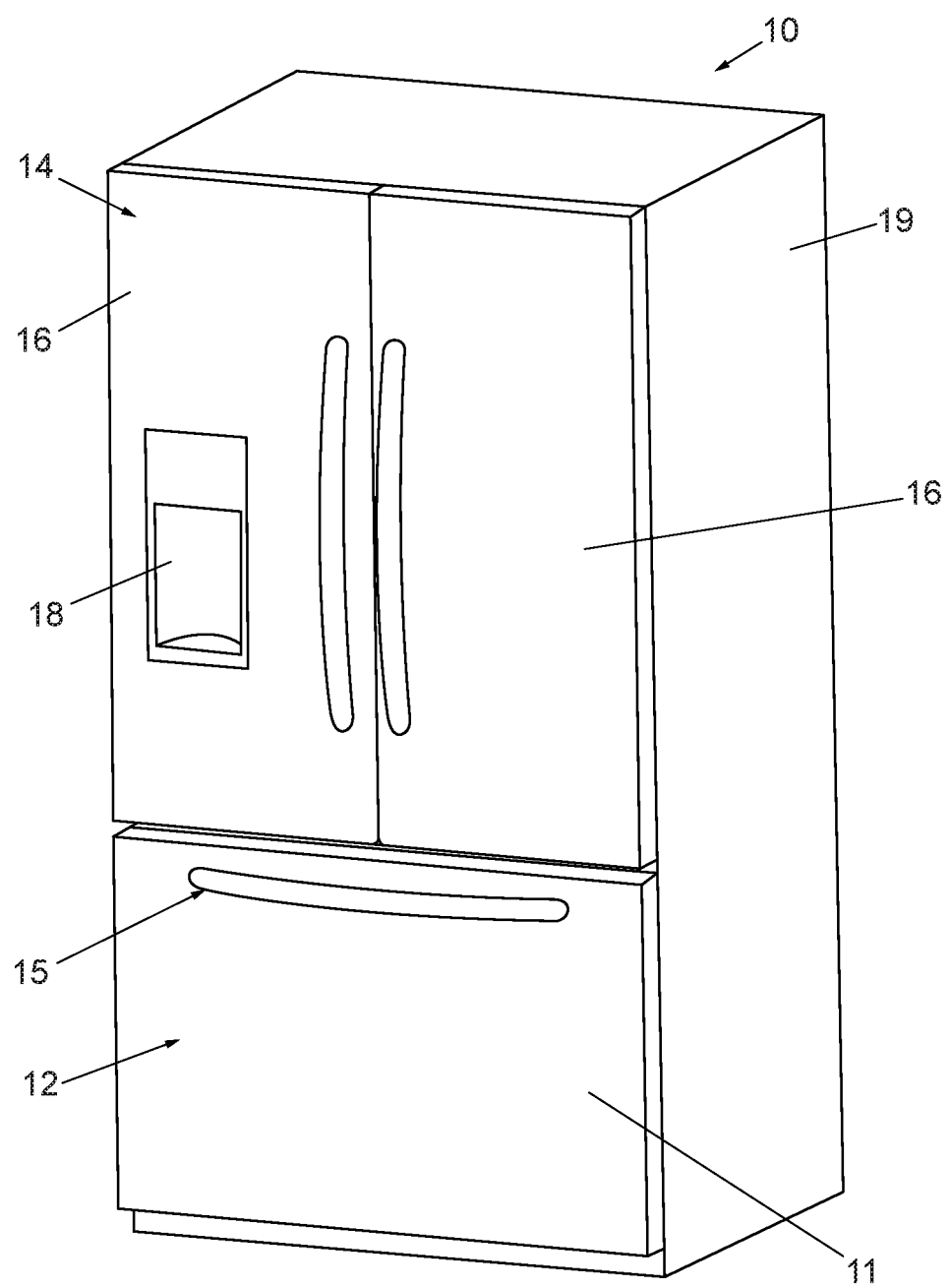
FIG. 1 is a front perspective view of a household French Door Bottom Mount showing doors of the refrigerator in a closed position.
Figure 2:
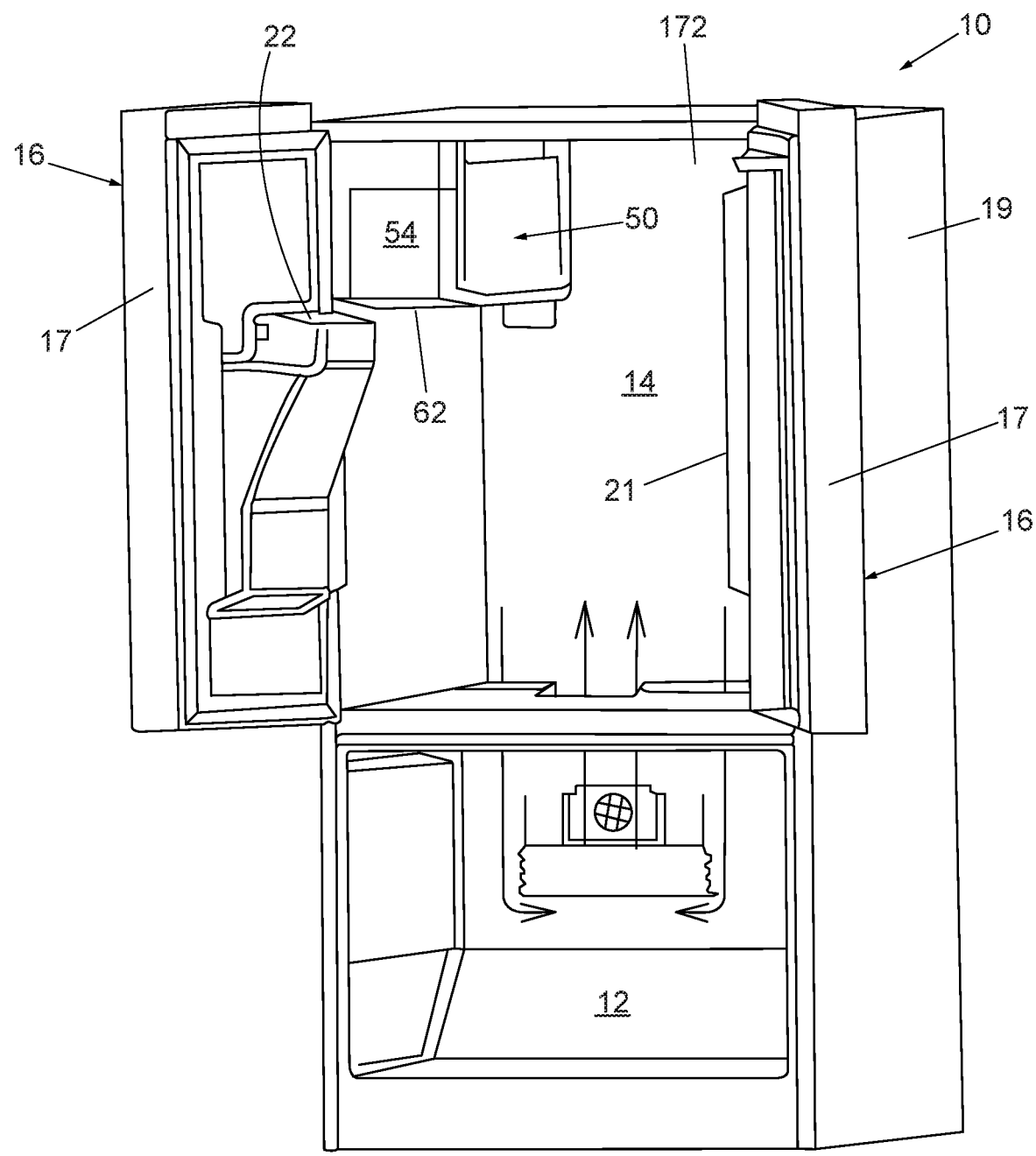
FIG. 2 is a front perspective view of the refrigerator of FIG. 1 showing the doors in an open position and an ice maker in a fresh food compartment.

Referring now to the drawings, FIG. 1 shows a refrigerator 10. Although the detailed description that follows concerns a domestic refrigerator 10, the invention can be embodied by refrigeration appliances other than with a domestic refrigerator 10. Further, an embodiment is described in detail below, and shown in the figures as a bottom-mount configuration of a refrigerator 10, including a fresh food compartment 14 disposed vertically above a freezer compartment 12. However, the refrigerator 10 can have any desired configuration including at least a fresh food compartment 14 and an ice maker 50 (FIG. 2), such as a top mount refrigerator (freezer disposed above the fresh food compartment), a side-by-side refrigerator (fresh food compartment is laterally next to the freezer compartment), a standalone refrigerator or freezer, etc.

One or more doors 16 shown in FIG. 1 are pivotally coupled to a cabinet 19 of the refrigerator 10 to restrict and grant access to the fresh food compartment 14. The door 16 can include a single door that spans the entire lateral distance across the entrance to the fresh food compartment 14, or can include a pair of French-type doors 16 as shown in FIG. 1 that collectively span the entire lateral distance of the entrance to the fresh food compartment 14 to enclose the fresh food compartment 14. For the latter configuration, a center flip mullion 21 (FIG. 2) is pivotally coupled to at least one of the doors 16 to establish a surface against which a seal provided to the other one of the doors 16 can seal the entrance to the fresh food compartment 14 at a location between opposing side surfaces 17 (FIG. 2) of the doors 16. The mullion 21 can be pivotally coupled to the door 16 to pivot between a first orientation that is substantially parallel to a planar surface of the door 16 when the door 16 is closed, and a different orientation when the door 16 is opened. The externally-exposed surface of the center mullion 21 is substantially parallel to the door 16 when the center mullion 21 is in the first orientation, and forms an angle other than parallel relative to the door 16 when the center mullion 21 is in the second orientation. The seal and the externally-exposed surface of the mullion 21 cooperate approximately midway between the lateral sides of the fresh food compartment 14.

A dispenser 18 (FIG. 1) for dispensing at least ice pieces, and optionally water, can be provided on an exterior of one of the doors 16 that restricts access to the fresh food compartment 14. The dispenser 18 includes a lever, switch, proximity sensor or other device that a user can interact with to cause frozen ice pieces to be dispensed from an ice bin 54 (FIG. 2) of the ice maker 50 disposed within the fresh food compartment 14. Ice pieces from the ice bin 54 can be delivered to the dispenser 18 via an ice chute 22 (FIG. 2), which extends at least partially through the door 16 between the dispenser 18 and the ice bin 54.

Referring to FIG. 1, the freezer compartment 12 is arranged vertically beneath the fresh food compartment 14. A drawer assembly (not shown) including one or more freezer baskets (not shown) can be withdrawn from the freezer compartment 12 to grant a user access to food items stored in the freezer compartment 12. The drawer assembly can be coupled to a freezer door 11 that includes a handle 15. When a user grasps the handle 15 and pulls the freezer door 11 open, at least one or more of the freezer baskets is caused to be at least partially withdrawn from the freezer compartment 12.

The freezer compartment 12 is used to freeze and/or maintain articles of food stored in the freezer compartment 12 in a frozen condition. For this purpose, the freezer compartment 12 is in thermal communication with a freezer evaporator (not shown) that removes thermal energy from the freezer compartment 12 to maintain the temperature therein at a temperature of 0° C. or less during operation of the refrigerator 10 preferably between 0° C. and −50° C., more preferably between 0° C. and −30° C. and even more preferably between 0° C. and −20° C.

The refrigerator 10 includes an interior liner 172 (FIG. 2) that defines the fresh food compartment 14. The fresh food compartment 14 is located in the upper portion of the refrigerator 10 in this example and serves to minimize spoiling of articles of food stored therein. The fresh food compartment 14 accomplishes this by maintaining the temperature in the fresh food compartment 14 at a cool temperature that is typically above 0° C., so as not to freeze the articles of food in the fresh food compartment 14. It is contemplated that the cool temperature preferably is between 0° C. and 10° C., more preferably between 0° C. and 5° C. and even more preferably between 0.25° C. and 4.5° C. According to some embodiments, cool air from which thermal energy has been removed by the freezer evaporator can also be blown into the fresh food compartment 14 to maintain the temperature therein greater than 0° C. preferably between 0° C. and 10° C., more preferably between 0° C. and 5° C. and even more preferably between 0.25° C. and 4.5° C. For alternate embodiments, a separate fresh food evaporator can optionally be dedicated to separately maintaining the temperature within the fresh food compartment 14 independent of the freezer compartment 12. According to an embodiment, the temperature in the fresh food compartment 14 can be maintained at a cool temperature within a close tolerance of a range between 0° C. and 4.5° C., including any subranges and any individual temperatures falling with that range. For example, other embodiments can optionally maintain the cool temperature within the fresh food compartment 14 within a reasonably close tolerance of a temperature between 0.25° C. and 4° C.

Figure 3:
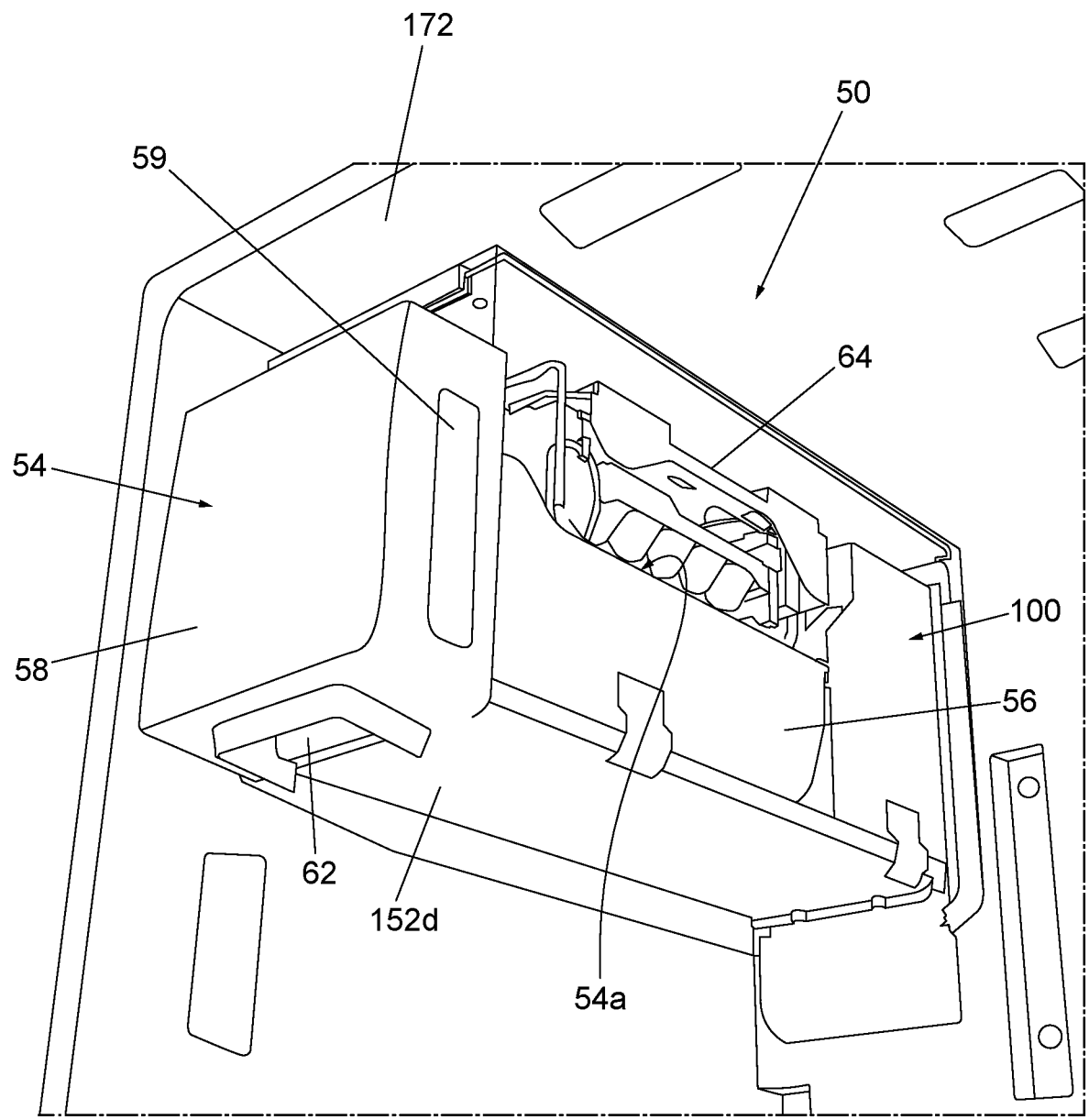
FIG. 3 is a side perspective view of an ice maker with a side wall of a frame of the ice maker removed.

An illustrative embodiment of the ice maker 50 is shown in FIG. 3. In general, the ice maker 50 includes a housing 152, an ice tray 64, an ice bin 54 that stores ice pieces made by the ice tray 64, an evaporator/defrost assembly 182 provides cooled air, and an air handler assembly 100 that circulates the cooled air to the ice tray 64 and the ice bin 54. The ice maker 50 is secured within the fresh food compartment 14 using any suitable fastener. The housing 152 is generally rectangular in shape for receiving the ice bin 54.

A plurality of fasteners, described in detail below, may be used for securing the housing 152 of the ice maker 50 within the fresh food compartment 14 of the refrigerator 10.

Referring now to FIG. 3, for clarity the ice maker 50 is shown with a side wall of the housing 152 removed. The ice bin 54 includes a reservoir 56 having an open, front end and an open top. A front cover 58 is secured to the front end of the reservoir 56 to enclose the front end of the reservoir 56. When secured together to form the ice bin 54, the reservoir 56 and the front cover 58 define an internal cavity 54a of the ice bin 54 used to store the ice pieces made by the ice tray 64. The front cover 58 may be secured to the reservoir 56 by mechanical fasteners that can be removed using a suitable tool, examples of which include screws, nuts and bolts, or any suitable friction fitting possibly including a system of tabs allowing removal of the front cover 58 from the reservoir 56 by hand and without tools. Alternatively, the front cover 58 is non-removably secured in place on the reservoir 56 using methods such as, but not limited to, adhesives, welding, non-removable fasteners, etc. In various other examples, a recess 59 is formed in a side of the front cover 58 to define a handle that may be used by a user for ease in removing the ice bin 54 from the ice maker 50. An aperture 62 is formed in a bottom of the front cover 58. A rotatable auger (not shown) can extend along a length of the ice bin 54. As the auger rotates, ice pieces in the ice bin 54 are urged ice towards the aperture 62 wherein an ice crusher (not shown) is disposed. The ice crusher is provided for crushing the ice pieces conveyed thereto, when a user requests crushed ice. The augur can optionally be automatically activated and rotated by an auger motor assembly (not shown) of the air handler assembly 100. The aperture 62 is aligned with the ice chute 22 (FIG. 2) when the door 16 is closed. This alignment allows for the auger to push the frozen ice pieces stored in the ice bin 54 into the ice chute 22 to be dispensed by the dispenser 18.

Keeping with FIG. 3, the ice tray 64 is positioned in an upper portion of the ice maker 50. In one example, the ice tray 64 is a twist-tray type, in which the ice tray 64 is rotated upside down and twisted along its longitudinal axis to thereby break the frozen ice pieces free from the ice reservoirs of the ice tray 64 where they fall into the internal cavity 54a of the ice bin 54 located below the ice tray 64. Still, a conventional metal water tray with a plurality of sweeper-arms and a harvest heater for partially melting the ice pieces, or even other types of ice maker assemblies like the finger-evaporator type, could also be utilized.

Figure 4:
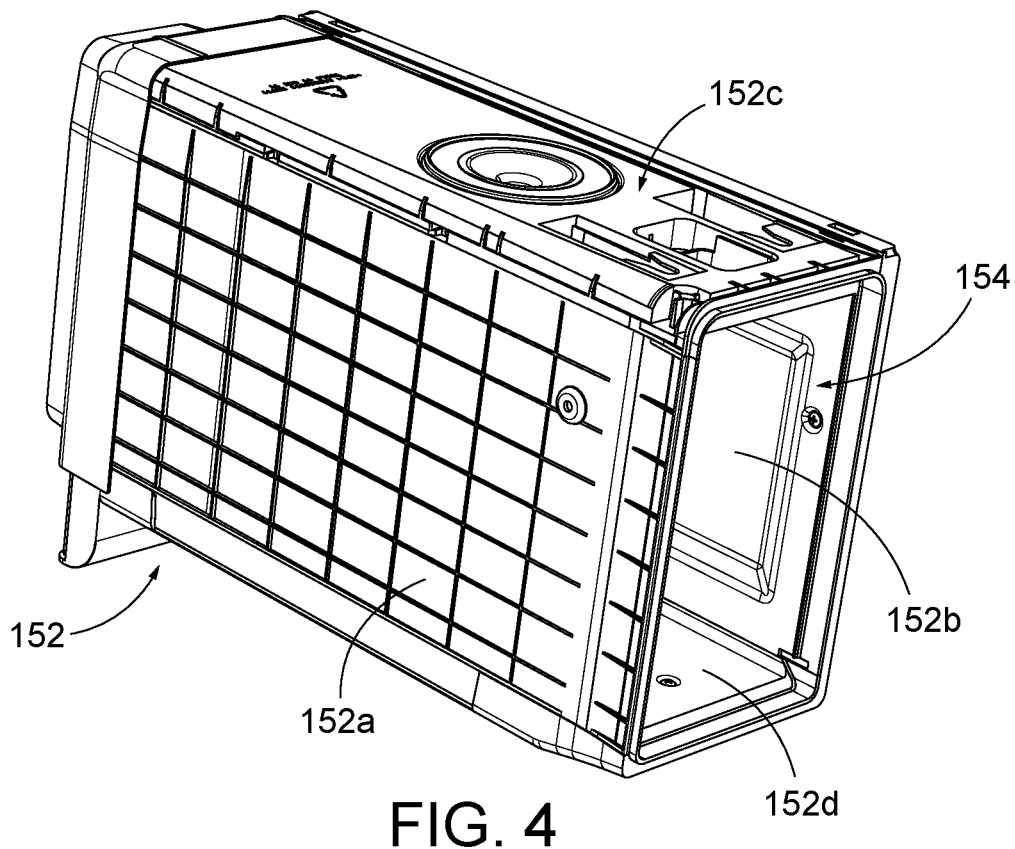
FIG. 4 is a side perspective view of a housing of the ice maker shown in FIG. 2.

As shown in FIG. 4, the housing 152 of the ice maker 50 includes sides 152a, 152b, a top 152c and a bottom 152d. The sides 152a, 152b, the top 152c and the bottom 152d define an open front 154 into which an ice bin (not shown) can be inserted. In the embodiment wherein the ice maker 50 is located within the fresh food compartment 14, which has an above-freezing temperature, the side 152b, the top 152c and the bottom 152d of the ice maker housing 152 must be insulated. In the embodiment shown, the housing 152 includes a first housing portion 156 (FIG. 5), a second housing portion 164 (FIG. 7) and a third housing portion 166 (FIG. 8), as described in detail below.

Figure 5:
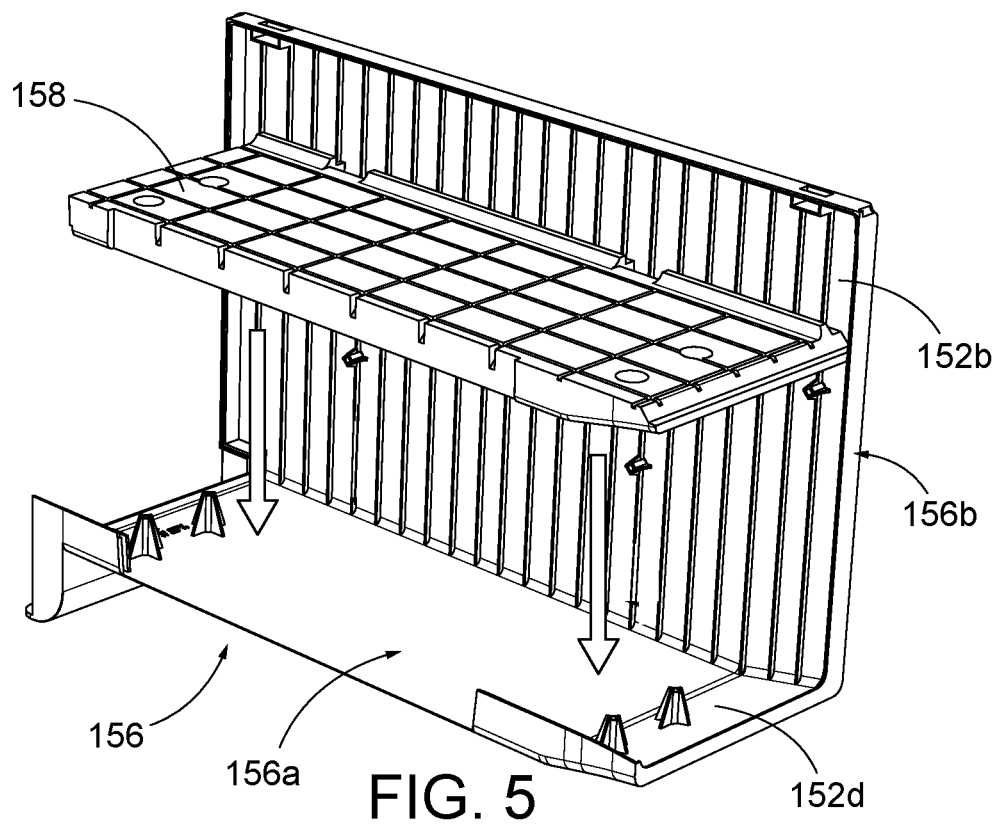
FIG. 5 is an exploded perspective view of a first housing portion and bottom insulation for the housing of FIG. 4.

Referring to FIG. 5, the illustrated embodiment of the first housing portion 156 is an L-shaped frame that includes a base 156a that defines an exterior surface of the bottom 152d of the housing 152 and a leg 156b that defines an exterior surface of the side 152b of the housing 152. A bottom insulation member 158 is attached to an upper surface of a base 156a of the first housing portion 156 (i.e., the bottom 152d of the housing 152), as represented by arrows in FIG. 5.

Figure 6:
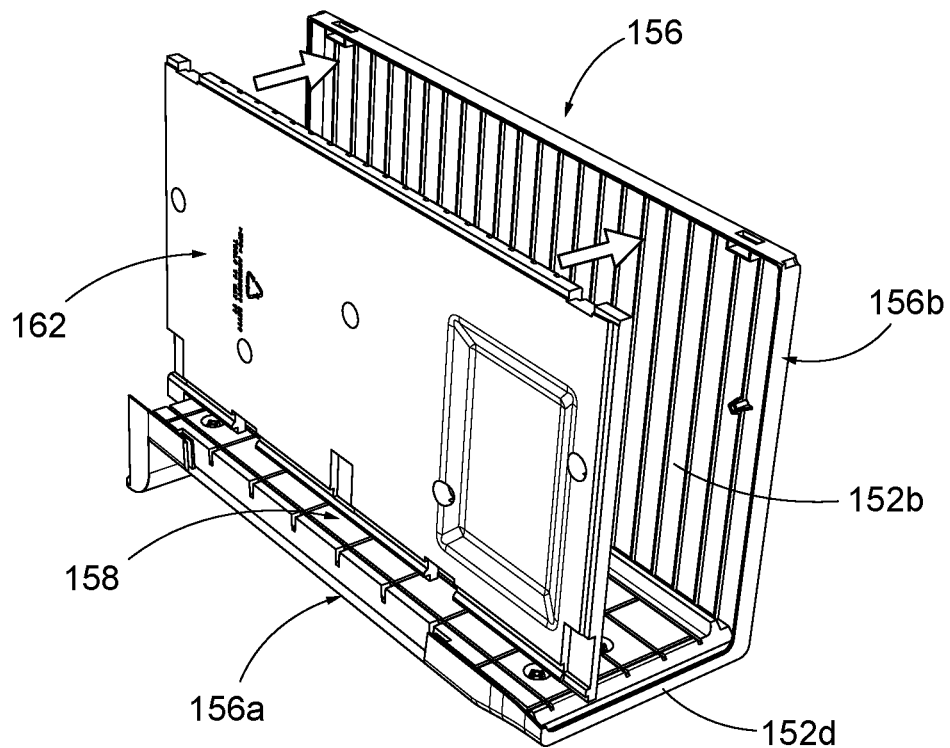
FIG. 6 is an exploded perspective view of a side insulation for attaching to the assembly shown in FIG. 4.

Referring to FIG. 6, a side insulation member 162 is attached to the leg 156b of the first housing portion 156, as represented by arrows in FIG. 6. In the embodiment shown in FIGS. 5 and 6, the bottom insulation member 158 and the side insulation member 162 include features and contours that match with corresponding features and contours on the base 156a and the leg 156b of the first housing portion 156, respectively. The bottom insulation member 158 and the side insulation member 162 can be secured to the first housing portion 156 using fastening means, including but limited to, screws, snap-fits, adhesives, press fits, etc.

Figure 7:
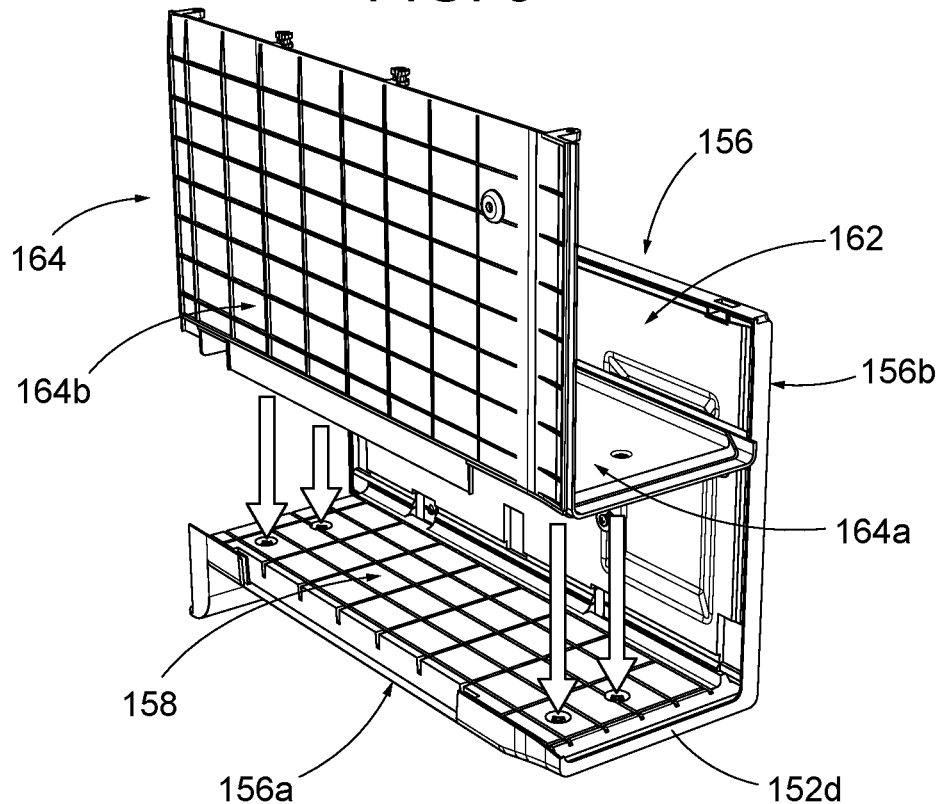
FIG. 7 is an exploded perspective view of a second housing portion for attaching to the assembly shown in FIG. 6.

Referring to FIG. 7, the illustrated embodiment of the second housing portion 164 is an L-shaped frame that is attached to the base 156a of the first housing portion 156 (as represented by arrows in FIG. 7). The second housing portion 164 includes a base 164a that is positioned on top of the bottom insulation member 158 and a leg 164b that defines the side 152a of the housing 152. The second housing portion 164 may be secured to the first housing portion 156 using fastening means, including but limited to, screws, snap-fits, adhesives, press fits, etc. It is also contemplated that ultrasonic welding can be used to secure the first housing portion 156 and the second housing portion 164 together.

Figure 8:
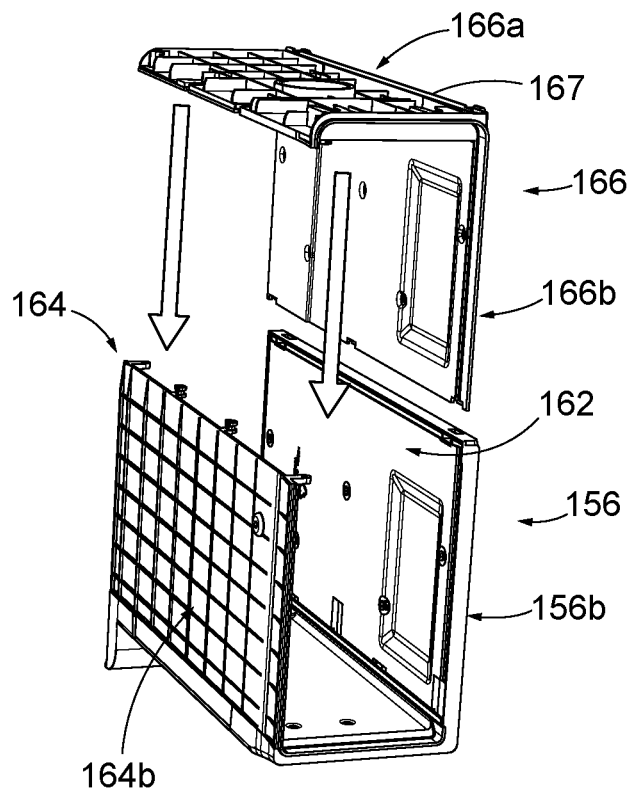
FIG. 8 is an exploded perspective view of a third housing portion for attaching to the assembly shown in FIG. 7.

Referring to FIG. 8, the illustrated embodiment of the third housing portion 166 is an L-shaped frame that is attached to the leg 156b of the first housing portion 156, as represented by arrows in FIG. 8. The third housing portion 166 includes a base 166a that defines the top 152c of the housing 152. An edge of the base 166a attaches to an upper edge of the leg 164b of the second housing portion 164. A leg 166b of the third housing portion 166 is positioned adjacent the side insulation member 162 to capture the side insulation member 162 between the leg 156b of the first housing portion 156 and the leg 166b of the third housing portion 166. The third housing portion 166 may be secured to the first housing portion 156 and the second housing portion 164 using fastening means, including but limited to, screws, snap-fits, adhesives, press fits, etc. It is also contemplated that ultrasonic welding can be used to secure the first housing portion 156, the second housing portion 164 and the third housing portion 166 together.

Optionally, a tab 167 extends from an exterior surface of the base 166a of the third housing portion 166. In the embodiment shown, the tab 167 is disposed along the edge where the base 166a and the leg 166b meet. The tab 167 is dimensioned and positioned as described in detail below. Still, the tab 167 could be located at other locations upon the base 166a.

Figure 9:
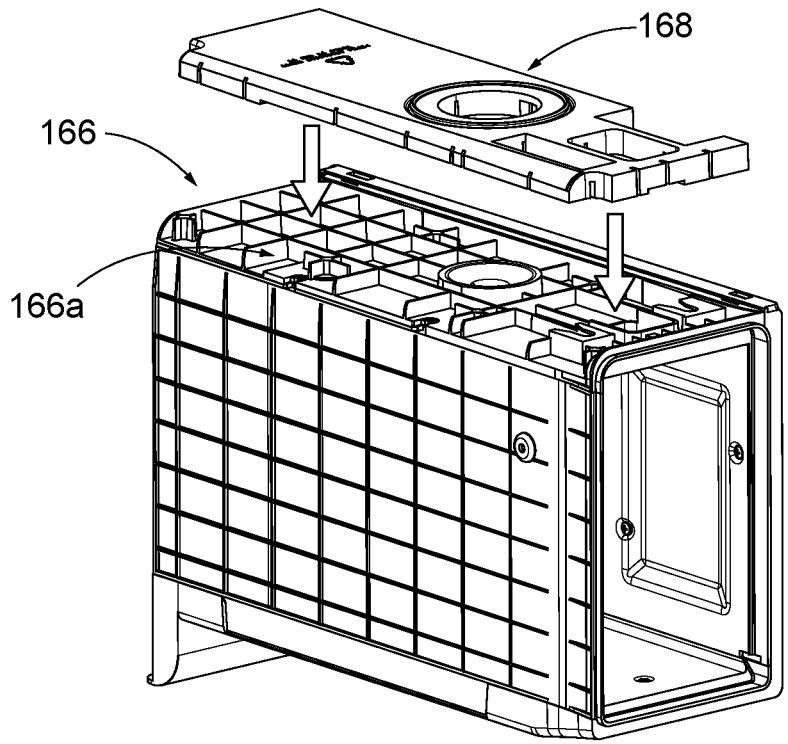
FIG. 9 is an exploded perspective view of a top insulation for attaching to the assembly shown in FIG. 8.

Referring to FIG. 9, a top insulation member 168 is attached to the exterior surface of the base 166a of the third housing portion 166 (i.e., the top 152c of the housing 152), as represented by arrows in FIG. 9. In the embodiment shown, the top insulation member 168 includes features and contours that match with corresponding features and contours on the base 166a of the third housing portion 166. The top insulation member 168 can be secured to the third housing portion 166 using fastening means, including but limited to, screws, snap-fits, adhesives, press fits, etc.

Figure 10:
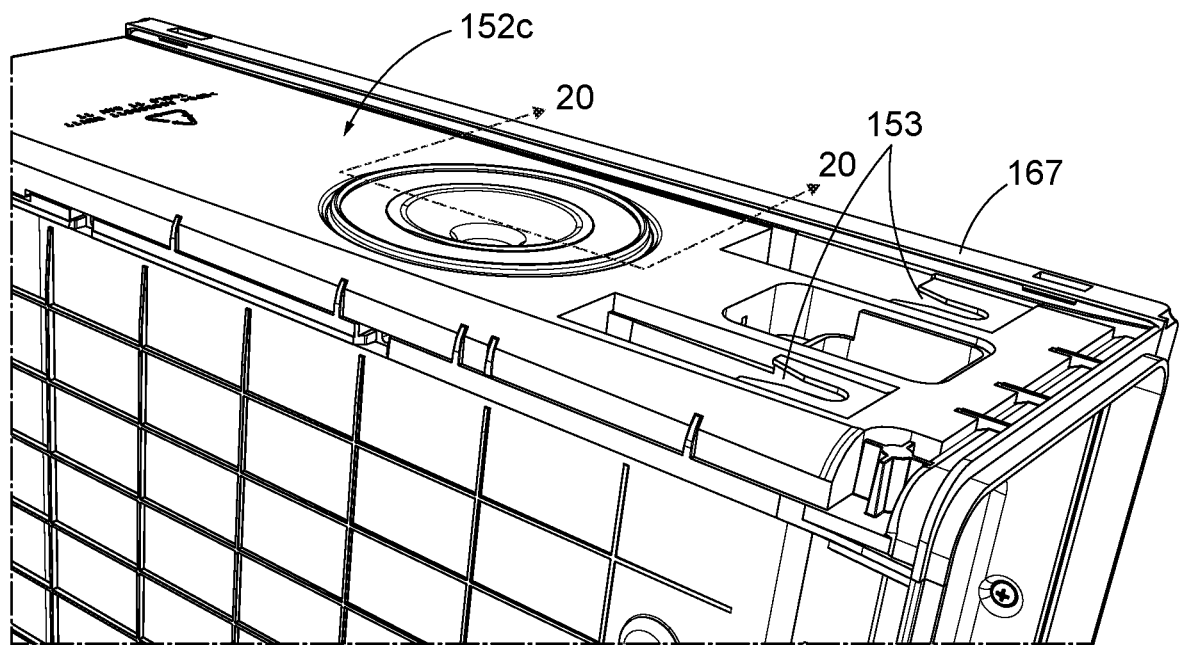
FIG. 10 is an enlarged perspective view of a top of the housing shown in FIG. 4.

Referring to FIG. 10, the tab 167 of the third housing portion 166 is dimensioned to extend above the upper surface of the top insulation member 168. In the embodiment shown, the tab 167 has an elongated rectangular shape and extends along the entire edge between the base 166a and the leg 166b. It is contemplated that the tab 167 could be other shapes, such as rounded and be segmented into one or more sections. In the embodiment shown the upper surface of the tab 167 is flat. It is contemplated that the upper surface of the tab 167 can also be curved, stepped or various combinations of the foregoing.

Figure 20:
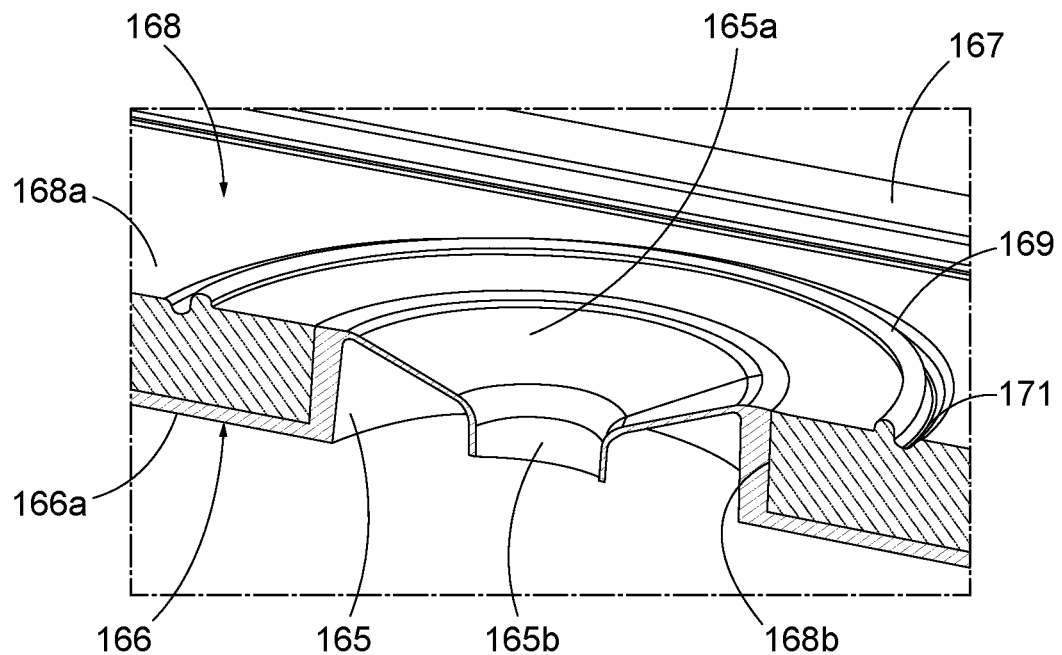
FIG. 20 is an enlarged section view taken along line 20-20 of FIG. 10 showing a sealing arrangement for a top insulation member of the housing of FIG. 4.

Referring to FIG. 20, a ring-shaped protrusion 169 and a ring-shaped groove 171 can be coupled to, and are preferably formed integrally together with a top surface 168a of the top insulation member 168. When formed integrally with the top insulation member 168, the protrusion 169 is likewise formed of a foam material; however, it could also be provided as a rubber part, an over-molded part, or other separate element coupled to the top insulation member 168. The ring-shaped protrusion 169 and the ring-shaped groove 171 are disposed around an opening 168b extending through the top insulation member 168. The opening 168b is dimensioned and positioned to align with and receive a cylindrical flange 165 formed in the base 166a of the third housing portion 166. The cylindrical flange 165 includes a funnel-shaped portion 165a having an opening 165b at a lower end. The opening 165b is dimensioned to allow a water fill tube of a water fill assembly (not shown) to pass through the opening 165b. The ring-shaped protrusion 169 is positioned and dimensioned to sealingly engage a lower surface of a top wall 173a of the liner 172 (FIG. 11), as described in detail below.

Figure 11:
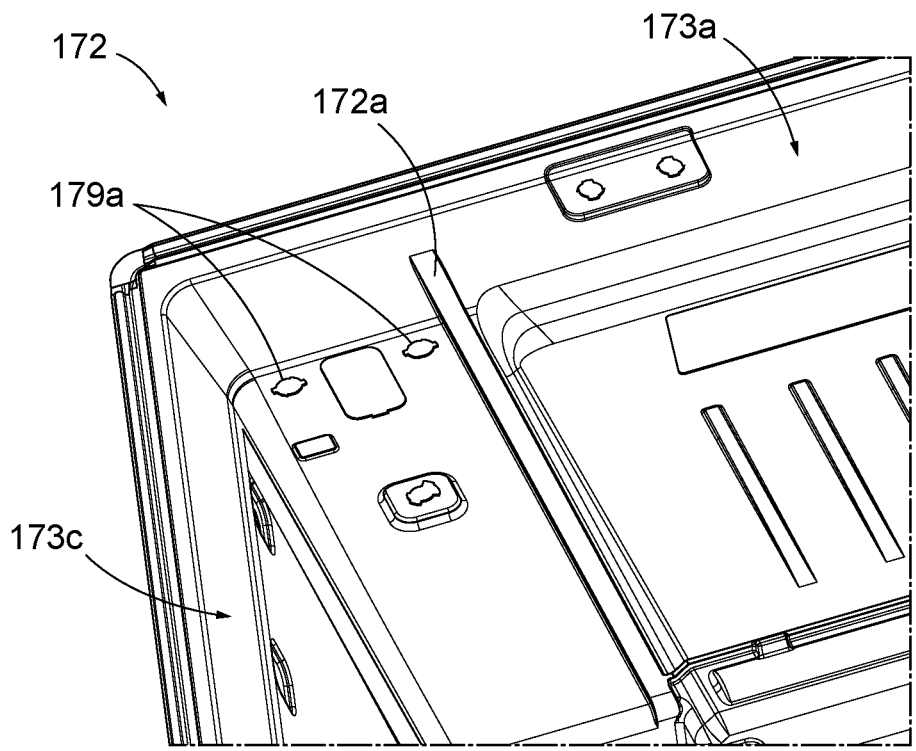
FIG. 11 is an enlarged perspective view of an inner surface of an upper wall of a liner for the fresh food compartment of the refrigerator of FIG. 1.

Referring to FIG. 11, a recess 172a is formed in a lower surface of the top wall 173a of the liner 172. The recess 172a is dimensioned and positioned to receive the tab 167 when the housing 152 is positioned in the upper corner of the liner 172. In the embodiment shown, the recess 172a is an elongated rectangular groove that receives the similarly shaped tab 167. The recess 172a can be any of a variety of shapes, such as rounded, segmented, curved, stepped, etc. so long as the recess 172a receives the tab 167.

In the embodiment shown, the housing 152 is assembled using three different housing portions 156, 164, 166. It is contemplated that the housing 152 can be assembled using any number of housing portions, e.g., one, two, three, four, etc. Some of the housing portions are described as having an "L" shape, although it is contemplated that some could be formed of multiple straight parts or some could have a "U" shape, etc. For example, it is contemplated that any three adjacent walls of the housing 152 can be defined by a single U-shaped housing portion and the remaining wall of the housing 152 can be defined by a separate straight housing portion. For example, the sides 152a, 152b and the bottom 152d of the housing 152 can be defined by a U-shaped housing portion and the top 152c of the housing 152 can be defined by a separate straight housing portion. In the embodiment shown, the insulation members 158, 162, 168 in the housing 152 are shown as pre-formed pieces of insulation. It is contemplated that the insulation members 158, 162, 168 can made of rigid pre-formed EPS (expanded polystyrene) panels. It is also contemplated that the insulation members 158, 162, 168 in the housing 152 can also be formed by injecting expandable foam insulation into enclosed spaces in the housing 152 and/or onto surfaces of the housing 152.

As described in detail above, the housing 152 includes insulation members on only three sides—the top, the bottom, and the right side. The side 152a of the housing 152, which attaches to a side wall 173c of the liner 172 of the fresh food compartment 14, is simply a solid piece of plastic with no insulation. Instead, this side 152a of the ice maker 50 relies upon the blown foam insulation that exists in the adjacent side wall 173c of the liner 172. In this manner, the overall width of the ice maker 50 is reduced to provide a "slim" ice maker compartment that occupies relatively less width within the refrigerator compartment as compared with conventional ice makers.

Figure 12:
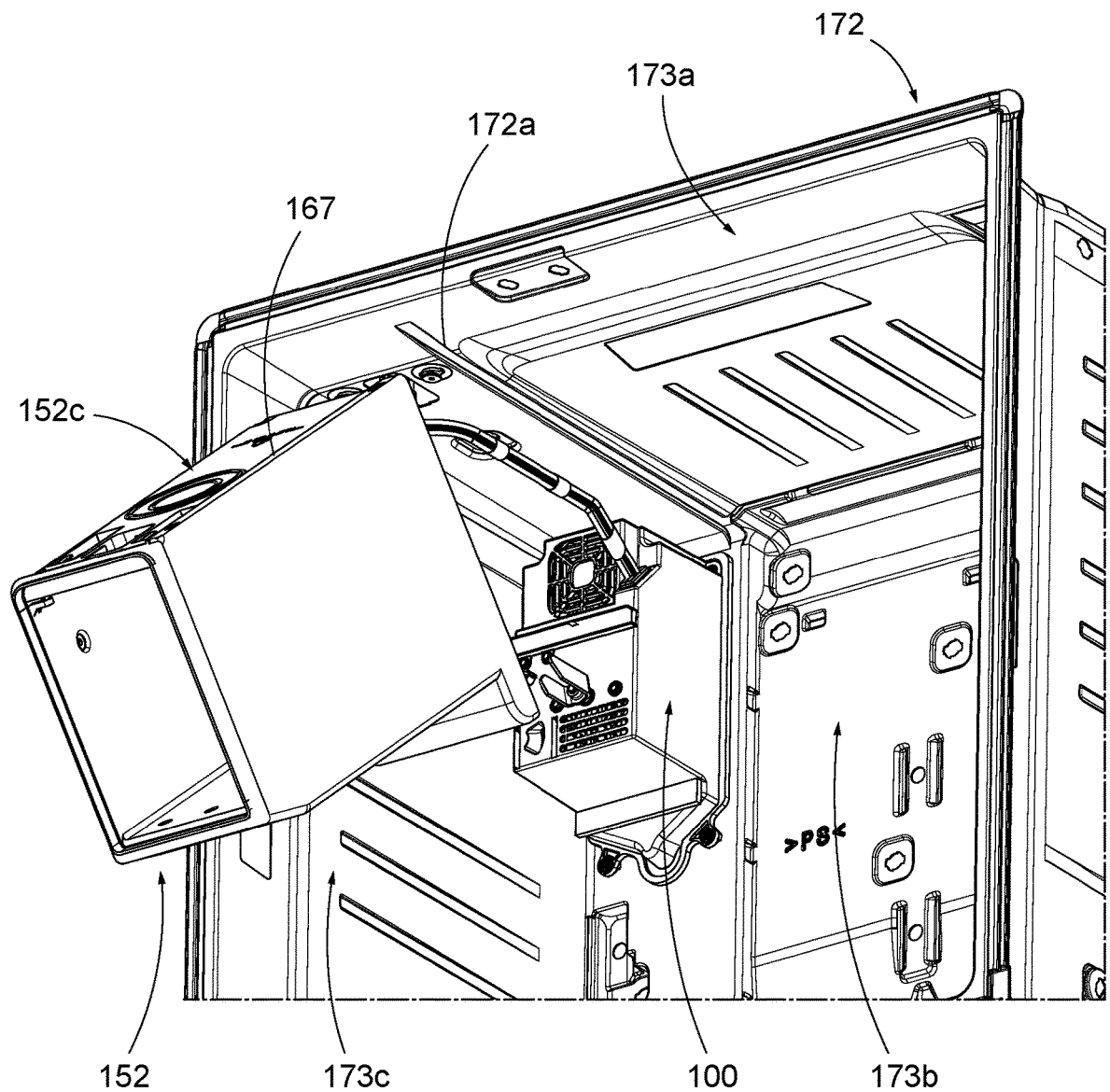
FIG. 12 is an exploded perspective view of the housing of FIG. 4 being inserted into the liner of FIG. 11.

Referring now to FIG. 12, during assembly the air handler assembly 100 is secured to a back wall 173b of the liner 172. The housing 152 is positioned over the air handler assembly 100 and rotated upwards until the top 152c of the housing engages the top wall 173a of the liner 172 and the tab 167 of the housing 152 is received into the recess 172a in the top wall 173a of the liner 172. The housing 152 can then be slid into the liner 172 until the rear of the housing 152 contacts the back wall 173b of the liner 172. The tab 167 and the recess 172a allow for the proper positioning of the housing 152 against the liner 172 and aid in retaining the housing 152 against the liner 172 while an operator secures the housing 152 to the liner 172.

Figure 21:
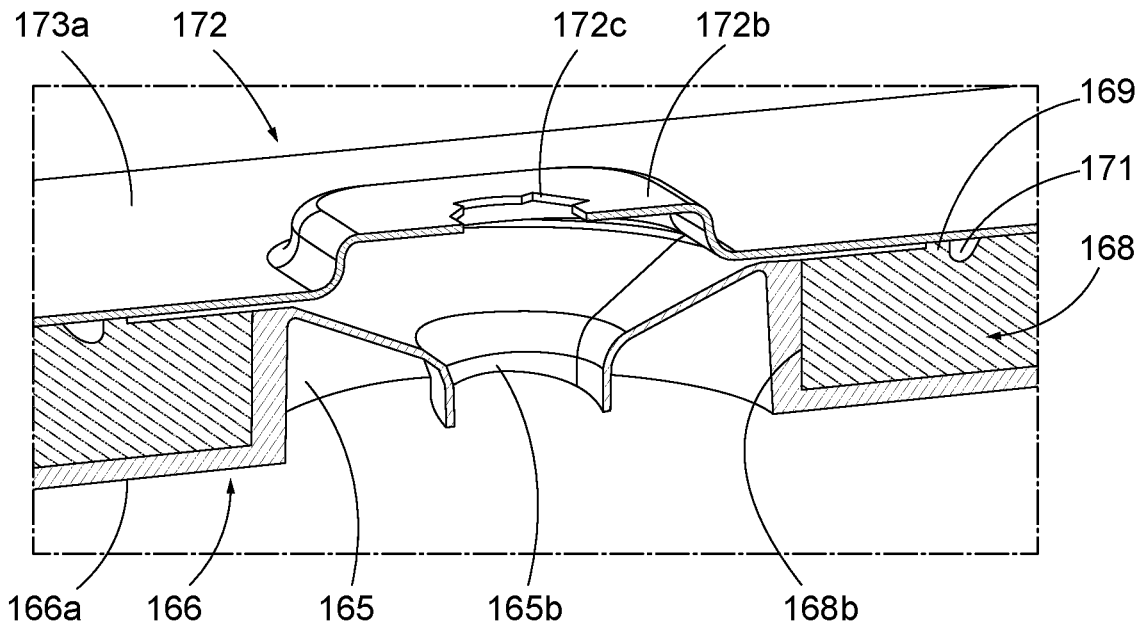
FIG. 21 is an enlarged section view taken along line 21-21 of FIG. 16 showing the sealing arrangement of FIG. 20 in contact with the liner of FIG. 11.

Referring to FIG. 21, the ring-shaped protrusion 169 of the top insulation member 168 is dimensioned and positioned to engage the lower surface of the top wall 173a when the housing 152 is secured to the liner 172. In particular, the ring-shaped protrusion 169 is positioned around a raised boss 172b formed in the top wall 173a of the liner 172. It is contemplated that the ring-shaped protrusion 169 may at least partially deform and/or deflect into the ring-shaped groove 171 when the top insulation member 168 is pressed against the top wall 173a of the liner 172. Thus, the ring-shaped protrusion 169 can provide a rim-seal around the boss 172 and the cylindrical flange 165 as against the below-freezing air of the ice maker 50 to thereby inhibit ice crystal formation during water supply to the ice tray 64. An opening 172c extends through the boss 172b for allowing the water fill tube of the water fill assembly (not shown) to pass through the liner 172 and into the housing 152. It is contemplated that the opening 172c can be keyed or notched to mate within a fitting (not shown) on the water fill tube to secure the water fill tube to the liner 172. Although the ring-shaped protrusion 169 is illustrated as having a circular geometry that completely circumscribes the boss 172 and the cylindrical flange 165, it is contemplated that the protrusion 169 can have various other sizes and geometries as desired, may extend less than completely around the water fill assembly, may be discontinuous, and/or may comprise a combination of seals.

Figure 13:
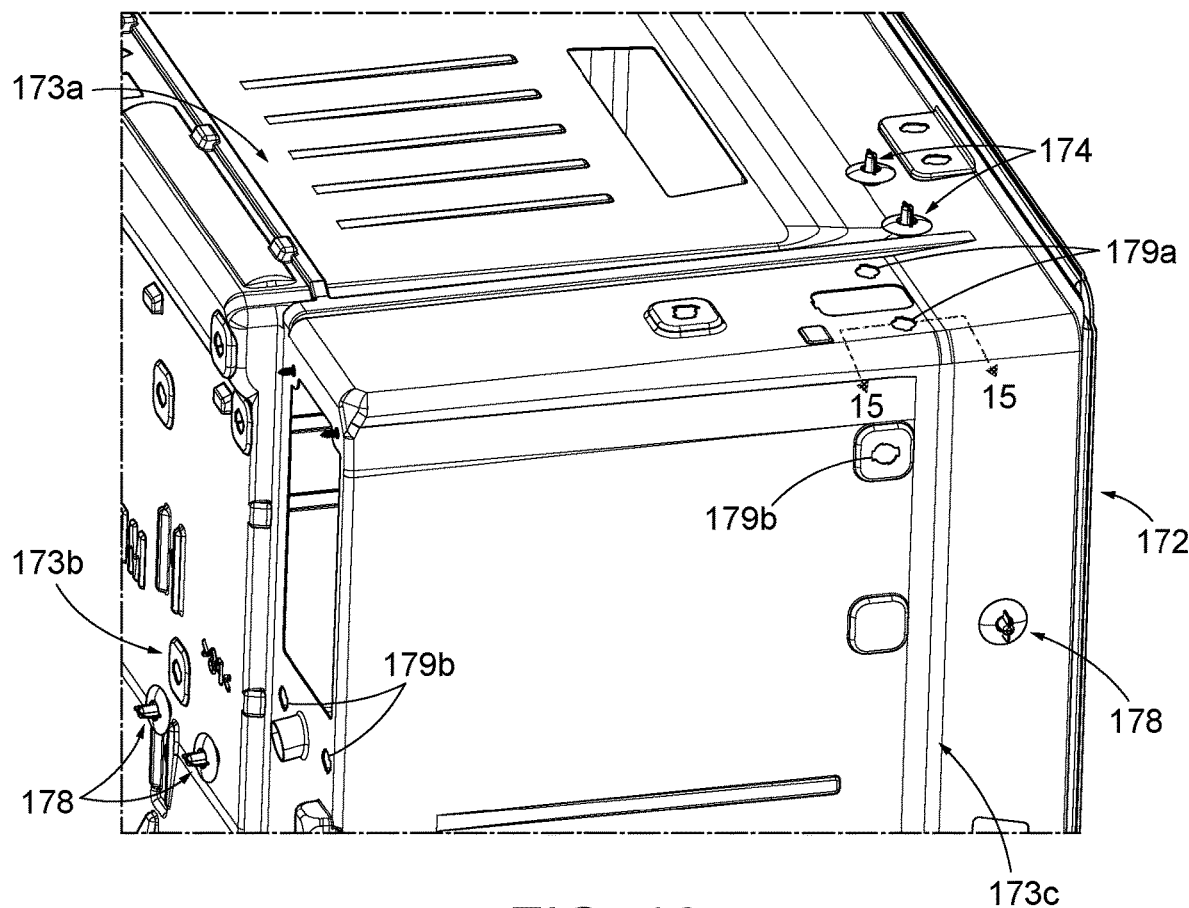
FIG. 13 is an exploded perspective view of first and second twist-lock nuts for attaching the housing of FIG. 4 to the liner of FIG. 11.
Figures 14A, 14B:
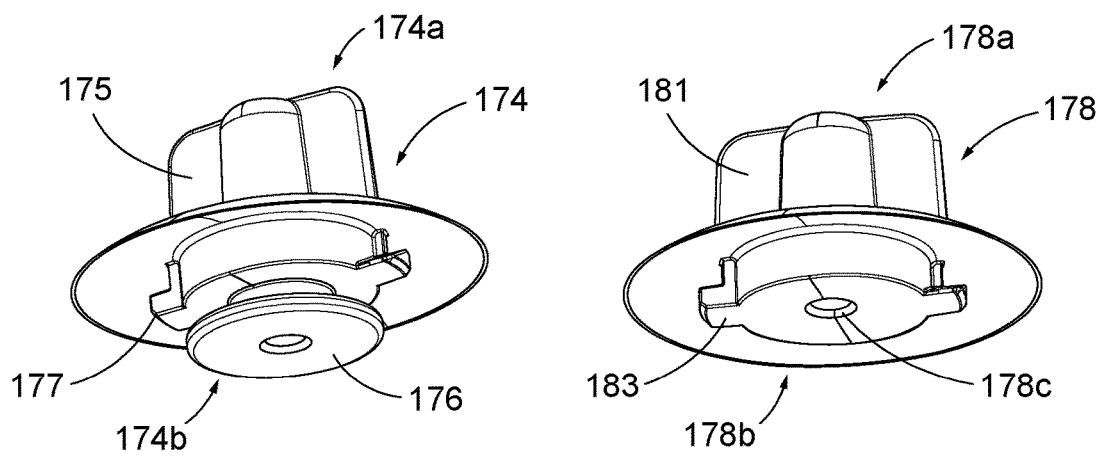
FIG. 14A is a bottom perspective view of the first twist-lock nut of FIG. 13.
FIG. 14B is a bottom perspective view of the second twist-lock nut of FIG. 13.
Figure 15:
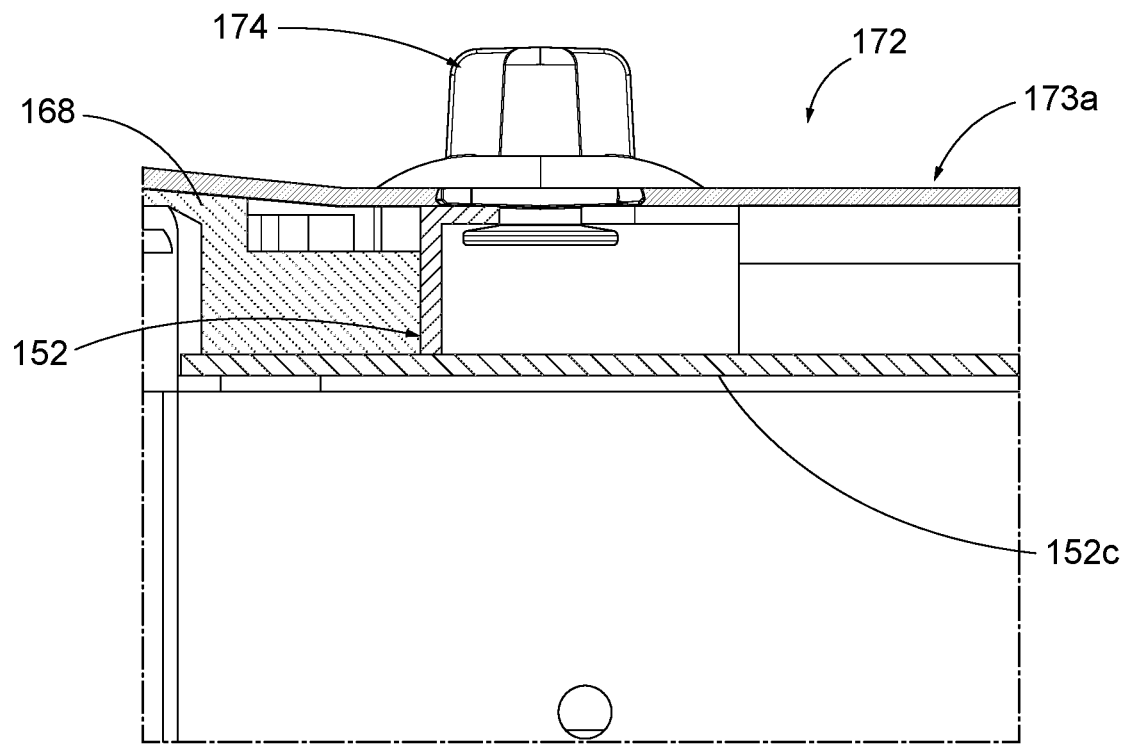
FIG. 15 is an enlarged section view taken along line 15-15 of FIG. 13 showing the first twist-lock nut of FIG. 14A securing the housing of FIG. 4 to the liner of FIG. 11.

Referring now to FIGS. 13-15, to further assist in the assembly process anchors, i.e. first twist-lock anchor nuts 174 and second twist-lock anchor nuts 178 are used to support and/or attach the housing 152 (FIG. 4) to the liner 172. Although shown and described as "twist-lock" anchor nuts, it is understood that the anchors could be retained in various other manners, such as snap-fit, screw-down, clips, other mechanical fasteners/retainers, adhesives, welding, etc.

Referring to FIG. 14A, in the embodiment shown the first anchor nuts 174 have tabs 175 on a first end 174a and an outwardly extending flange 176 formed on a second end 174b. A cam feature 177 is formed in the first anchor nuts 174 adjacent the flange 176. The cam feature 177 is dimensioned to engage a first receiving hole 179a (see also FIG. 11) in the top wall 173a of the liner 172 to secure the first anchor nuts 174 to the liner 172. Referring to FIG. 15, the outwardly extending flange 176 is dimensioned to extend through the first receiving hole 179a and engage a mating feature 153 (e.g., a slot, see FIG. 10) in the top 152c of the housing 152 to secure the housing 152 to the top wall 173a of the liner 172. The mating feature 153 can be designed to receive the first anchor nuts 174 as the housing 152 is inserted into the fresh food compartment 14 (i.e., slid backwards). Such installation may be translational and/or may include a rotational component. During installation, the first anchor nuts 174 are used to support the housing 152 to temporarily hold the housing 152 in place against gravity at the desired installed position.

Referring to FIG. 14B, in the embodiment shown the second anchor nuts 178 have tabs 181 on a first end 178a and a cam feature 183 formed on a second end 178b. A hole 178c extends into the second end 178b of the second anchor nut 178. As shown in FIG. 13, the second anchor nuts 178 are disposed in second receiving holes 179b in the back wall 173b and a side wall 173c of the liner 172. The cam feature 183 is dimensioned to engage the second receiving hole 179b to secure the second anchor nuts 178 into the second receiving holes 179b.

Figure 16:
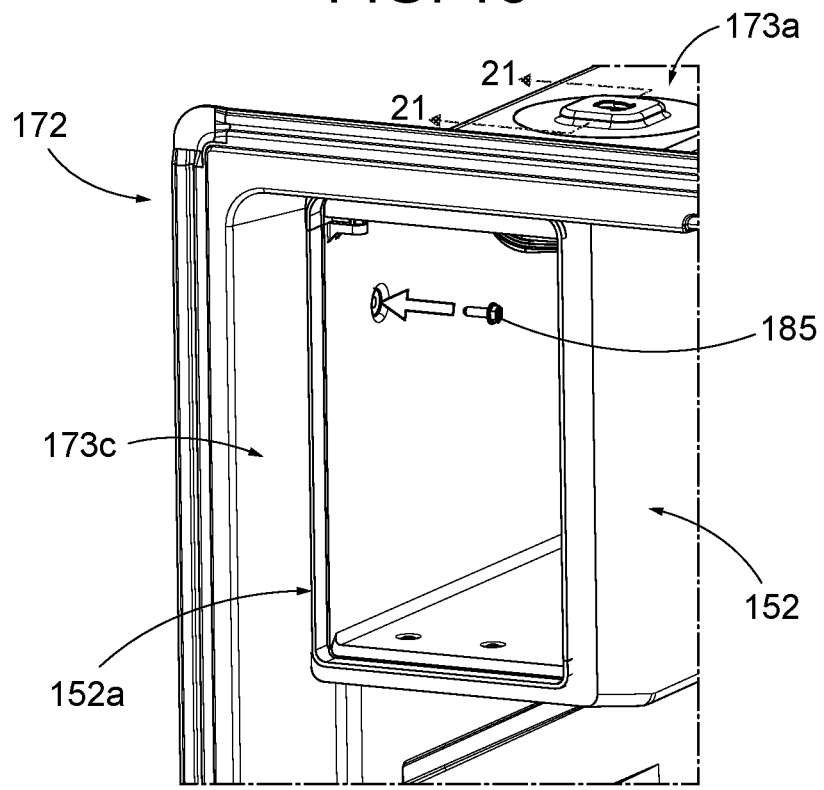
FIG. 16 is an exploded perspective view showing fasteners for securing the housing of FIG. 4 to the liner of FIG. 11.

Referring to FIG. 16, fasteners 185 extend through the side 152a of the housing 152 into the second anchor nuts 178 (not shown) to secure the housing 152 to the liner 172. During installation, while the first anchor nuts 174 are supporting the housing 152 within the fresh food compartment 14, the second anchor nuts 178 receive the fasteners 185 to secure the housing 152 to the liner 172.

It is contemplated that the two different types of twist-lock anchor nuts 174, 178 can be replaced with a single anchor nut (not shown) with a hole and a formed distal end. The formed distal end can be used to secure the top of the housing 152 to the liner 172 and the hole can be used to receive the fasteners 185 extending through the side 152a of the housing 152.

It is further contemplated that an exterior of the housing 152 may include mounting holes or the like (not shown) for supporting a shelf (not shown) of the refrigerator.

Figure 17:
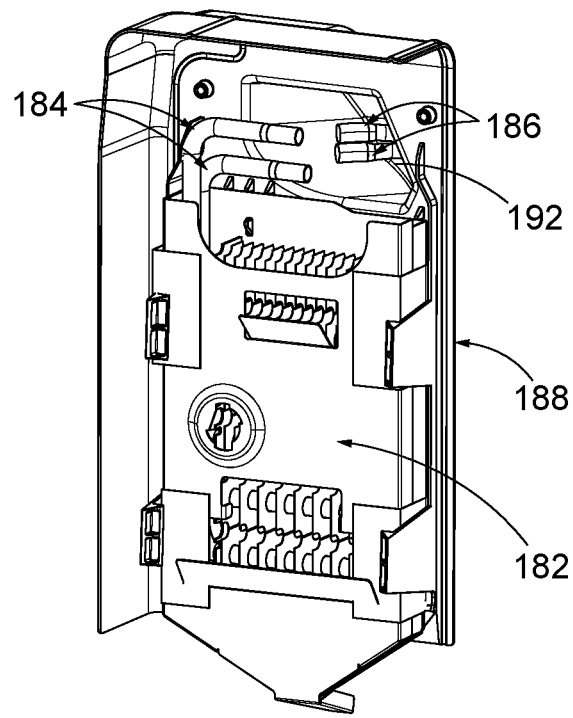
FIG. 17 is a front perspective view of an ice maker evaporator attached to a backplate.
Figure 18:
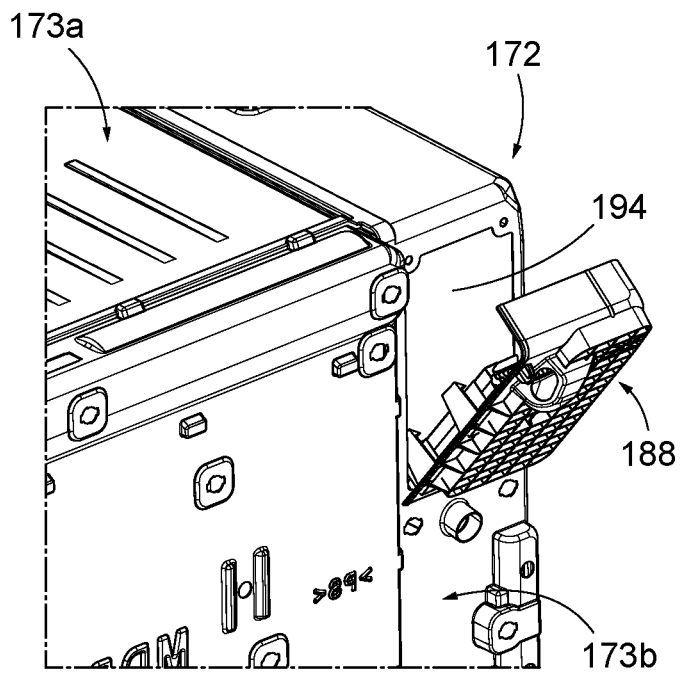
FIG. 18 is a rear perspective view of the ice maker evaporator of FIG. 16 partially attached to the liner of FIG. 11.
Figure 19:
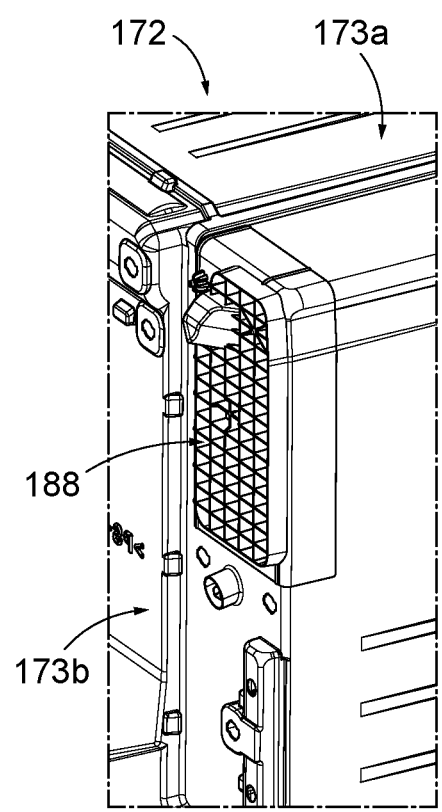
FIG. 19 is a rear perspective view of the ice maker evaporator of FIG. 16 completely attached to the liner of FIG. 11.

Referring to FIGS. 17-19, the evaporator/defrost assembly 182 is disposed in a rear of the ice maker 50 (see FIG. 3). The evaporator/defrost assembly 182 is sealingly connected to a main system evaporator (not shown) by metal supply lines 186. Conventionally, input/output metal tubing lines 184 of the evaporator/defrost assembly 182 are brazed to the metal supply lines 186 after the ice maker 50 is installed in the fresh food compartment 14. This is difficult to accomplish in a tight interior corner space using an open flame, and may cause damage to the plastic liner, etc.

The evaporator/defrost assembly 182 of the present embodiment is first secured to a backplate 188 that is separate from the refrigerator cabinet. The metal supply lines 186 are threaded through a hole 192 in the backplate 188 and brazed to the input/output metal tubing lines 184 of the evaporator/defrost assembly 182 while the evaporator/defrost assembly 182 is positioned outside of the liner 172. It is contemplated that the foregoing brazing operation can take place on a manufacturing workstation next to the refrigerator or another location remote from the plastic interior liner. After the brazing operation, the evaporator/defrost assembly 182 and the backplate 188 are moved, using with the pipes extending through the hole 192, until the evaporator/defrost assembly 182 and the backplate 188 are placed in the appropriate position in the liner 172 (e.g., in an opening 194) and are secured to the rear of a liner 172 using fastening means, including but not limited to, fasteners, adhesive, snap-fits, interference fits, etc. The liner 172 then is placed within a metal outer skin (not shown) of the refrigerator, and expanding insulating foam (not shown) is injected into the space between the liner 172 and the metal outer skin.

In addition or alternatively, the ice maker of the present application may further be adapted to mounting and use on a freezer door. In this configuration, although still disposed within the freezer compartment, at least the ice maker (and possibly an ice bin) is mounted to the interior surface of the freezer door. It is contemplated that the ice mold and ice bin can be separated elements, in which one remains within the freezer cabinet and the other is on the freezer door.

Cold air can be ducted to the freezer door from an evaporator in the fresh food or freezer compartment, including the system evaporator. The cold air can be ducted in various configurations, such as ducts that extend on or in the freezer door, or possibly ducts that are positioned on or in the sidewalls of the freezer liner or the ceiling of the freezer liner. In one example, a cold air duct can extend across the ceiling of the freezer compartment, and can have an end adjacent to the ice maker (when the freezer door is in the closed condition) that discharges cold air over and across the ice mold. If an ice bin is also located on the interior of the freezer door, the cold air can flow downwards across the ice bin to maintain the ice pieces at a frozen state. The cold air can then be returned to the freezer compartment via a duct extending back to the evaporator of the freezer compartment. A similar ducting configuration can also be used where the cold air is transferred via ducts on or in the freezer door. The ice mold can be rotated to an inverted state for ice harvesting (via gravity or a twist-tray) or may include a sweeper-finger type, and a heater can be similarly used. It is further contemplated that although cold air ducting from the freezer evaporator as described herein may not be used, a thermoelectric chiller or other alternative chilling device or heat exchanger using various gaseous and/or liquid fluids could be used in its place. In yet another alternative, a heat pipe or other thermal transfer body can be used that is chilled, directly or indirectly, by the ducted cold air to facilitate and/or accelerate ice formation in the ice mold. Of course, it is contemplated that the ice maker of the instant application could similarly be adapted for mounting and use on a freezer drawer.

Alternatively, it is further contemplated that the ice maker of the instant application could be used in a fresh food compartment, either within the interior of the cabinet or on a fresh food door. It is contemplated that the ice mold and ice bin can be separated elements, in which one remains within the fresh food cabinet and the other is on the fresh food door.

In addition or alternatively, cold air can be ducted from another evaporator in the fresh food or freezer compartment, such as the system evaporator. The cold air can be ducted in various configurations, such as ducts that extend on or in the fresh food door, or possibly ducts that are positioned on or in the sidewalls of the fresh food liner or the ceiling of the fresh food liner. In one example, a cold air duct can extend across the ceiling of the fresh food compartment, and can have an end adjacent to the ice maker (when the fresh food door is in the closed condition) that discharges cold air over and across the ice mold. If an ice bin is also located on the interior of the fresh food door, the cold air can flow downwards across the ice bin to maintain the ice pieces at a frozen state. The cold air can then be returned to the fresh food compartment via a ducting extending back to the compartment with the associated evaporator, such as a dedicated icemaker evaporator compartment or the freezer compartment. A similar ducting configuration can also be used where the cold air is transferred via ducts on or in the fresh food door. The ice mold can be rotated to an inverted state for ice harvesting (via gravity or a twist-tray) or may include a sweeper-finger type, and a heater can be similarly used. It is further contemplated that although cold air ducting from the freezer evaporator (or similarly a fresh food evaporator) as described herein may not be used, a thermoelectric chiller or other alternative chilling device or heat exchanger using various gaseous and/or liquid fluids could be used in its place. In yet another alternative, a heat pipe or other thermal transfer body can be used that is chilled, directly or indirectly, by the ducted cold air to facilitate and/or accelerate ice formation in the ice mold. Of course, it is contemplated that the ice maker of the instant application could similarly be adapted for mounting and use on a fresh food drawer.

The present application discloses a refrigeration appliance including a fresh food compartment for storing food items in a refrigerated environment having a target temperature above 0° C. A liner defines the fresh food compartment and includes a top wall, a bottom wall, and a pair of opposing lateral side walls. An ice maker is disposed within the fresh food compartment for producing and storing ice pieces and mounted to the liner at an intersection of the top wall and one of the pair of opposing lateral side walls of the liner. The ice maker includes an ice tray for forming ice pieces. An ice bin receives and stores ice pieces produced by the ice tray. A housing contains the ice tray and ice bin. The housing has a first side, a second side, a bottom and a top. The housing includes a first housing portion defining an exterior surface of the bottom and an exterior surface of the first side. A second housing portion defines the second side and an interior surface of the bottom. A third housing portion defines an exterior surface of the top and an interior surface of the first side. A thermal insulation is disposed on the bottom, the first side and the top of the housing. The second side of the ice maker housing does not include thermal insulation and abuts one of the pair of opposing lateral side walls.

The invention has been described with reference to the example embodiments described above. Modifications and alterations will occur to others upon a reading and understanding of this specification. Examples embodiments incorporating one or more aspects of the invention are intended to include all such modifications and alterations insofar as they come within the scope of the appended claims.

What is claimed is:

1. A refrigeration appliance comprising:
   a fresh food compartment for storing food items in a refrigerated environment having a target temperature above zero degrees Centigrade;
   a liner defining said fresh food compartment and comprising a top wall, a bottom wall, and a pair of opposing lateral side walls; and
   an ice maker disposed within the fresh food compartment for producing and storing ice pieces and mounted to the liner at an intersection of the top wall and one of the pair of opposing lateral side walls of the liner, the ice maker comprising:
      an ice tray for forming ice pieces,
      an ice bin for receiving and storing ice pieces produced by the ice tray, and
      a housing containing the ice tray and ice bin, the housing having a first side, a second side, a bottom and a top and comprising:
         a first housing portion defining at least one of the bottom and the first side of the housing;
         a second housing portion defining at least one of the top and the second side of the housing; and
         thermal insulation disposed on the bottom, the first side and the top of the housing,
      wherein the second side of the ice maker housing is free of thermal insulation and abuts said one of the pair of opposing lateral side walls, and
      wherein said thermal insulation comprises:
         a first insulation member interposed between an exterior surface of the first side and an interior surface of the first side;
         a second insulation member interposed between an exterior surface of the bottom and an interior surface of the bottom; and
         a third insulation member interposed between an exterior surface of the top and the top wall of the liner,
      wherein the first insulation member, the second insulation member, and the third insulation member are separate from one another.

2. The refrigeration appliance of claim 1, wherein at least one of the first housing portion and the second housing portion is L-shaped or U-shaped.

3. The refrigeration appliance of claim 1, wherein the top wall of the liner comprises a recess, and a tab extends upwards beyond the top of the housing and is received within the recess of the liner.

4. The refrigeration appliance of claim 1, wherein each of the first, second, and third insulation members comprises a rigid pre-formed EPS panel.

5. The refrigeration appliance of claim 1, further comprising:
   an anchor disposed in the top wall of the liner, an end of the anchor extending through the top wall of the liner and having a flange for engaging a receiving opening formed in the top of the housing.

6. The refrigeration appliance of claim 1, further comprising:
   an anchor disposed in said one of the pair of opposing lateral side walls; and
   a fastener extending through the second side of the housing into the anchor for securing the housing to the liner.

7. The refrigeration appliance of claim 1, further comprising:
   an opening in a back wall of the liner positioned proximate the ice maker; and
   a backplate for receiving an evaporator of the ice maker, the backplate attachable to the back wall of the liner to enclose the opening in the back wall.

8. A refrigeration appliance comprising:
   a fresh food compartment for storing food items in a refrigerated environment having a target temperature above zero degrees Centigrade;
   a liner defining said fresh food compartment and comprising a top wall, a bottom wall, and a pair of opposing lateral side walls; and
   an ice maker disposed within the fresh food compartment for producing and storing ice pieces and mounted to the liner at an intersection of the top wall and one of the pair of opposing lateral side walls, the ice maker comprising:
      an ice tray for forming ice pieces,
      an ice bin for receiving and storing ice pieces produced by the ice tray,
      a housing containing the ice tray and ice bin, the housing having a first side, a second side, a bottom and a top, a first cavity formed in the first side and a second cavity formed in the bottom, and a thermal insulation disposed in the first cavity and the second cavity, wherein the second side of the ice maker housing does not include thermal insulation and abuts said one of the pair of opposing lateral side walls, and wherein the housing comprises:
 a first housing portion defining an exterior surface of the bottom and an exterior surface of the first side; and
 a second housing portion defining the second side and an interior surface of the bottom,
 wherein the first housing portion and the second housing portion define the second cavity in the bottom.

9. The refrigeration appliance of claim 8, wherein the housing further comprises:
 a third housing portion defining an exterior surface of the top and an interior surface of the first side,
 wherein the first housing portion and the third housing portion define the first cavity in the first side.

10. The refrigeration appliance of claim 9, wherein said thermal insulation comprises:
 a first insulation member interposed between the exterior surface of the first side and the interior surface of the first side;
 a second insulation member interposed between the exterior surface of the bottom and the interior surface of the bottom; and
 a third insulation member interposed between the exterior surface of the top and the top wall of the liner,
 wherein the first insulation member, the second insulation member, and the third insulation member are separate from one another.

11. The refrigeration appliance of claim 10, wherein each of the first, second, and third insulation members comprises a rigid pre-formed EPS panel.

12. The refrigeration appliance of claim 8, wherein the top wall of the liner comprises a recess, and a tab extends upwards beyond the top of the housing and is received within the recess of the liner.

13. The refrigeration appliance of claim 12, wherein the tab extends along an edge between the first side and the top of the housing.

14. The refrigeration appliance of claim 8, further comprising:
 an anchor disposed in the top wall of the liner, an end of the anchor extending through the top wall of the liner and having a flange for engaging a receiving opening formed in the top of the housing.

15. The refrigeration appliance of claim 8, further comprising:
 an anchor disposed in said one of the pair of opposing lateral side walls; and
 a fastener extending through the second side of the housing into the anchor for securing the housing to the liner.

16. The refrigeration appliance of claim 8, further comprising:
 an opening in a back wall of the liner positioned proximate the ice maker; and
 a backplate for receiving an evaporator of the ice maker, the backplate attachable to the back wall of the liner to enclose the opening in the back wall.

17. An ice maker for producing and storing ice pieces, the ice maker mountable to a liner of a fresh food compartment at an intersection of a top wall and a lateral side wall of the liner, the ice maker comprising:
 an ice tray for forming ice pieces,
 an ice bin for receiving and storing ice pieces produced by the ice tray,
 a housing containing the ice tray and ice bin, the housing having a first side, a second side, a bottom and a top, a first cavity formed in the first side and a second cavity formed in the bottom, and
 a thermal insulation disposed in the first cavity and the second cavity,
 wherein the second side of the ice maker housing does not include thermal insulation, and
 wherein the housing comprises:
  a first housing portion defining an exterior surface of the bottom and an exterior surface of the first side; and
  a second housing portion defining the second side and an interior surface of the bottom,
  wherein the first housing portion and the second housing portion define the second cavity in the bottom.

18. The ice maker of claim 17, wherein the housing further comprises:
 a third housing portion defining an exterior surface of the top and an interior surface of the first side,
 wherein the first housing portion and the third housing portion define the first cavity in the first side.

19. The ice maker of claim 18, wherein said thermal insulation comprises:
 a first insulation member interposed between the exterior surface of the first side and the interior surface of the first side;
 a second insulation member interposed between the exterior surface of the bottom and the interior surface of the bottom; and
 a third insulation member interposed between the exterior surface of the top and the top wall of the liner,
 wherein the first insulation member, the second insulation member, and the third insulation member are separate from one another.

* * * * *